US00RE35610E

United States Patent [19]

Yancy

[11] E Patent Number: Re. 35,610

[45] Reissued Date of Patent: Sep. 16, 1997

[54] BIRD FEEDER DEVICE

[76] Inventor: William C. Yancy, 3741 Seabrook Island Rd., Johns Island, Charleston County, S.C. 29455

[21] Appl. No.: 285,221

[22] Filed: Aug. 3, 1994

Related U.S. Patent Documents

Reissue of:

[64] Patent No.: 5,134,968
Issued: Aug. 4, 1992
Appl. No.: 721,983
Filed: Jun. 27, 1991

[51] Int. Cl.[6] ..... A01K 39/00

[52] U.S. Cl. ..... 119/57.8; 119/69.5

[58] Field of Search ..... 119/57.8, 61, 69.5, 119/72; D30/121, 123–126, 129, 130, 132, 133

[56] References Cited

U.S. PATENT DOCUMENTS

| | | | |
|---|---|---|---|
| D. 86,014 | 1/1932 | Diller | 119/69.5 |
| D. 87,364 | 7/1932 | Spindler | 119/695 X |
| D. 119,499 | 3/1940 | Howard . | |
| D. 120,005 | 4/1940 | Gautschi | D30/123 |
| D. 173,658 | 12/1954 | Jones . | |
| D. 194,683 | 2/1963 | Clegg . | |
| D. 199,499 | 11/1964 | Howard . | |
| D. 247,187 | 2/1978 | Hartinger | D30/123 |
| 812,167 | 2/1906 | Thompson . | |
| 825,452 | 7/1906 | Garretson . | |
| 1,369,315 | 2/1921 | Ankers . | |
| 2,372,073 | 3/1945 | Flournoy | 119/61 X |
| 2,484,263 | 10/1949 | Atkinson | 119/61 |
| 2,715,386 | 8/1955 | Jones . | |
| 2,779,311 | 1/1957 | Hamilton . | |
| 2,887,988 | 5/1959 | Cottongim . | |
| 3,084,666 | 4/1963 | Plaisance | 119/695 |
| 3,174,459 | 3/1965 | Browne . | |
| 3,202,131 | 8/1965 | Jones | 119/61 |
| 3,734,061 | 5/1973 | Kraus | 119/52 R |
| 4,291,648 | 9/1981 | Garvin | 119/61 |
| 4,546,730 | 10/1985 | Holland | 119/61 X |

*Primary Examiner*—Thomas Price
*Attorney, Agent, or Firm*—Tom R. Vestal

[57] ABSTRACT

A landscaping adornment also having as a purpose the feeding and/or watering of small birds and animals. The device constitutes a depiction of a naturally occurring object such as a seashell or leaf and has an open containment for seed or liquid. The materials of construction render the device waterproof and weatherproof.

11 Claims, 1 Drawing Sheet

BIRD FEEDER DEVICE

Matter enclosed in heavy brackets [ ] appears in the original patent but forms no part of this reissue specification; matter printed in italics indicates the additions made by reissue.

BACKGROUND OF THE INVENTION

This invention relates to gardening decorations and more specifically to useful devices for floral and fauna landscaping. More specifically, this invention relates to bird feeding and watering devices of a type not heretofore known.

It is known to have bird feeders capable of storing and dispensing several days and weeks of bird seed. Such feeders are supported in a number of ways-to structures, from the side, from the bottom, suspended from flexible or nearly flexible materials such as cords, string and the like. The feeder may also be suspended from a pole or rod, usually several feet off the ground to deter small animals.

Water fountains or basins may involve circulating water pumps and several tiers of cascading falls or be simply a basin holding still or nascent water. The materials of such fountains are usually concrete, plastic or similar moldable material impervious or nearly impervious to water. Such fountains are built to be placed on the ground or on substantial pedestals to support the weight of the basin and water.

It is also known to place decorative figurines in lawn and estate landscaping, including sundials, figurines of small animals and/or birds or other characters. The figurines may be placed on the ground, on a pedestal, pole or other means of support. The figurines may incorporate informational signs such as addresses, plant types, location, etc. They may take the form of devices reactionary to wind, such as chimes or windmills.

To date, no one has provided a simple, easily moved, non-obtrusive but eye catching device that can perform similar functions to that described above.

BRIEF DESCRIPTION OF THE INVENTION

This invention and its embodiments comprise a small, lightweight figurine or similar depiction of an ornamental device having an inverted cupped section or open containment, said cupped section being capable of containing liquids, seeds, meal, or similar foods for birds or small animals. The figurine device is preferably mounted on a small pole or rod that can be easily forced in the ground without prior ground preparation, and which makes the device easily movable from site to site within a landscape area.

The cupped section may represent a leaf or a seashell or other similar ornamental form. Additional ornamentation may be included as long as the light weight and mobility of the device is not compromised. Preferably, the cupped section will bear no more than four fluid ounces. In comparison, conventional bird feeders will contain one or more orders of magnitude of volume; bird baths, several orders of magnitude of such volume.

DETAILED DESCRIPTION OF THE INVENTION

Figure 1:
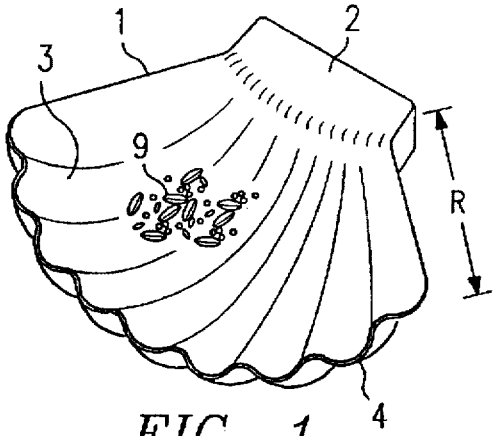
FIG. 1 is an overhead oblique view of the base of the invention in the form of a scallop seashell.
Figure 1A:
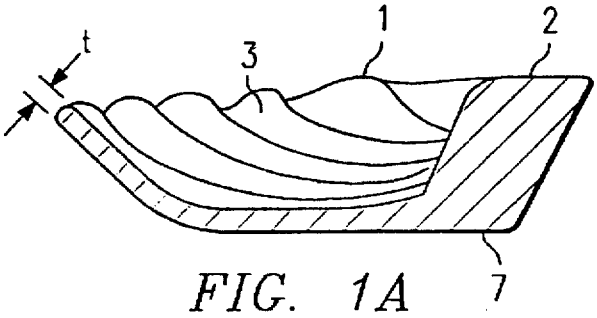
FIG. 1A is a cross sectional view of the device of FIG. 1.

In FIG. 1, a base 1 comprises a mounting section 2 and a cupped section 3. In the particular embodiment shown, the base is formed in the pattern of a scallop seashell having an outer rim 4 extending outwardly from a mounting section 2 a distance R.

It is of importance that the invention be small and easily movable in a landscape surrounding. The containment segment of cupped section 3 of the invention is capable of holding small amounts of liquid or seed 9 (as shown) and differs from conventional feeders in its mobility, small size and universally complimentary adornment to any landscape. For that reason, the distance R in the invention will be normally less than 8 inches, preferably in the range of 3½ to 4½ inches. The containment volume of the cupped section 3 is less than four fluid ounces, preferably about 1½ to 3 ounces.

Figure 2:
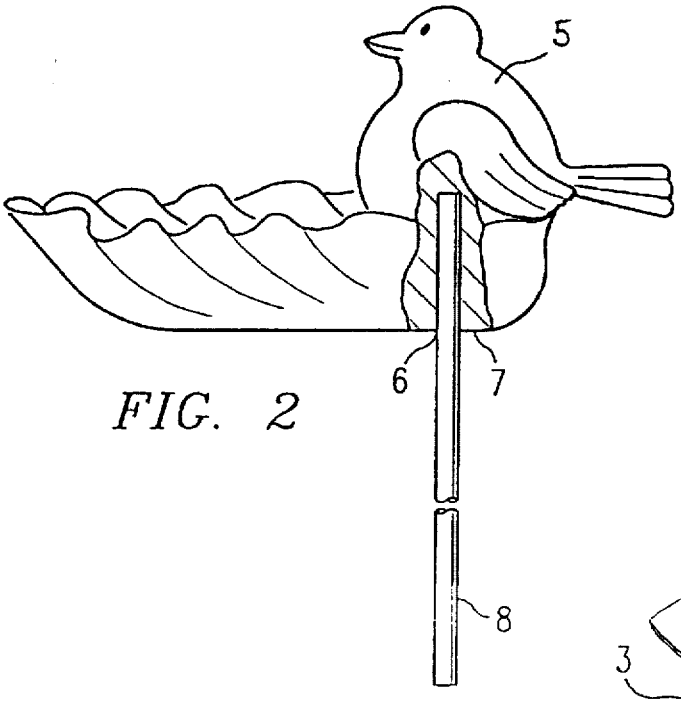
FIG. 2 is a side view of the invention with a small bird attached or perched on the mounting section of the base.

The thickness t (see FIG. 2) will depend somewhat on the materials of construction and will be no more than one inch. The thickness will also be a function of the method of formation and will preferably be no more than ¾ inch and more preferably will be no more than ½ inch. As shown in FIG. 2, a figurine 5, such as a bird may be attached to or formed on the upper side of the mounting section.

The materials of construction and/or coating lend to the adornment or inventive device in impervious or semi-impervious effect. The invention should withstand weathering conditions and be able to hold water or other liquid in the cupped section as well as birdseed.

Figure 3:
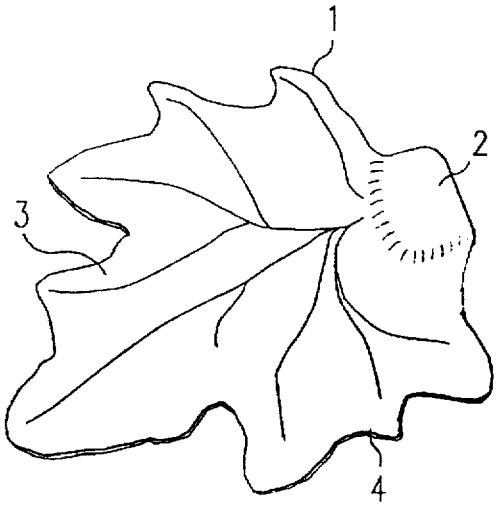
FIG. 3 is a perspective view of one embodiment of the invention in the form of a tree leaf.

FIG. 3 depicts another form of the invention, like numbers referring to like sections of FIG. 1. In this embodiment the base 1 is formed in the shape of an oak leaf.

The rod 8 is a slip fit in opening 6. The thickness of the mounting section 2 and figurine 5 permit easy drilling of the opening 6 in the under side 7 of the mounting section 2 after the base has been formed or cast. Rod 8 need be no larger than ½ inch in diameter and may be of wood, steel, aluminum or plastic. An especially weather resistant and strong material are rods made from fiber-glass.

The invention is especially well placed in flower gardens and low lying shrubbery. It may be moved each day when replacing bird seed. Or it may be filled with water or with sugar based liquid for hummingbirds. The invention may be easily stored during the off season. The invention makes an excellent accompanyment to conventional bird feeders and baths by providing additional and complementary feeding or watering stations for birds or small animals.

What is claimed:

1. A landscape adornment, comprising a base[,] having a mounting section and a cupped section unitarily formed from an impervious or semi-impervious material, said mounting section having an upper side and [a] *an* under side, *a substantial portion of* [and] said cupped section extending laterally outward from a single side of the mounting section, said cupped section having a middle containment segment and an outer edge continuous around the middle containment segment from the mounting, any portion of the outer edge being less than about [six] *eight* inches from the mounting section, the cross section of the middle containment segment from the mounting section to the outer edge being less than about one inch in thickness, said cross section forming an upwardly inverted arc to form an open containment of less than about four fluid ounces; said mounting section being thicker than said cupped section and having opening in the [underside] *under side* with a support rod receivable therein; and said support rod being less than ½ inch in diameter and more than about 18 inches in length.

2. The landscape adornment of claim 1, wherein the base is in the form of a leaf, [nutshell] *seashell* or similiar [(naturally occurring object.)] *naturally occurring object.*

3. The landscape adornment of claim 2, wherein the base is formed in the shape of an object selected from one of the following group of seashell and leaf.

4. The landscape adornment of claim 1, wherein [no] *any* portion of the outer edge is [greater than] about 3½ to 4½ inches from the base *mounting section* and the cross sectional thickness of the cupped section is [no greater] *less* than about ½ inch.

5. The landscape adornment of claim 1, including a figure of a bird or animal or fish attached to [the] *an* upper side of the mounting section of the base.

6. The landscape adornment of claim 5, wherein the figure is formed of the same material as the base and the opening in the [underside] *under side* of the base continues into the figure.

7. The landscape adornment of claim 1, formed from a material selected from the group of plastic, clay, compressed wood and plastic, crushed rock and plastic, sawdust and plastic, crushed rock and cement, cement.

8. A landscape adornment comprising a base having a mounting section and a cupped section, a [figure] *figurine* attached to an upper side of the mounting section, an opening in the [underside] *under side* of the mounting section forreceiving a support rod, said open continuing into the attached [figure] *figurine*, said base and [figure] *figurine* being formed of the same material and selected from the group consisting of cast iron, pewter, brass, aluminum, plastic, crushed rock and plastic, sawdust and plastic, crushed rock and cement, cement, or clay, the cross section of the cupped section forming an inverted arcuate shape of less than ½ inch in thickness and having an outer edge extending less than [greater than] about 3½ to 4½ inches from the mounting section, the base being formed in the shape of a seashell or leaf; and support rod less than ½ inch in diameter and greater than about 18 inches and no more than 48 inches in length.

9. A landscape adornment comprising a base having a mounting section, and a cupped section, said mounting section having an upper side and an [underside] *under side, a substantial portion of* said cupped section extending laterally outward from a single side of said mounting section and having a containment segment and an outer edge; a figurine attached to the upper side of the mounting section, said base and said figurine being formed of an impervious or semi-impervious material, the base being formed in the shape of a leaf or seashell, the cross section of the cupped section forming an inverted arcuate shape and the outer edge of the cupped section extending less than about 4½ inches from the mounting section and forming a containment of less than about four fluid ounces; and a rod means supporting the adornment in a landscape environment.

10. The landscape adornment of claim 9, wherein the thickness of the inverted arcuate shape is no greater than ½ inch.

*11. A landscape adornment comprising a base having a mounting section and a cupped section, a figurine attached to an upper side of the mounting section, an opening in the under side of the mounting section for receiving a support rod, said cupped section extending laterally outward from said mounting section and forming an inverted arcuate shape of less than about one inch in thickness and having an outer edge, any portion thereof extending less than about eight inches from the mounting section, the cupped section forming a containment segment of less than about four fluid ounces, the base and figurine being formed of the same material, and a support rod less than about ½ inch in diameter and greater than about 18 inches and no more than 48 inches in length.*

* * * * *